(12) United States Patent
Lee et al.

(10) Patent No.: US 7,082,234 B2
(45) Date of Patent: Jul. 25, 2006

(54) WAVELENGTH DIVISION MULTIPLEXING DEVICE CAPABLE OF COMPENSATING FOR DISPERSION AND DISPERSION SLOPE USING PURELY PHASE-SAMPLED FIBER BRAGG GRATING

(76) Inventors: Hojoon Lee, Dept. of Information Communication, Hoseo University, Mt. 29-1, Sechul-ri, Baebang-myun, Asan, Choongnam, 336-795 (KR); Govind P. Agrawal, Institute of Optics, University of Rochester, Wilmot 206, Rochester, NY (US) 14627

( * ) Notice: Subject to any disclaimer, the term of this patent is extended or adjusted under 35 U.S.C. 154(b) by 0 days.

(21) Appl. No.: 10/929,645

(22) Filed: Aug. 30, 2004

(65) Prior Publication Data

US 2006/0045416 A1 Mar. 2, 2006

(51) Int. Cl.
*G02B 6/28* (2006.01)
*G02B 6/34* (2006.01)
(52) U.S. Cl. .......................................... 385/24; 385/37
(58) Field of Classification Search .................. 385/10, 385/24, 37
See application file for complete search history.

(56) References Cited

U.S. PATENT DOCUMENTS

| 6,081,640 | A  | * | 6/2000  | Ouellette et al. | 385/37 |
| 6,317,539 | B1 | * | 11/2001 | Loh et al.       | 385/37 |
| 6,643,429 | B1 | * | 11/2003 | Robinson et al.  | 385/37 |
| 6,707,967 | B1 | * | 3/2004  | Rothenberg et al.| 385/37 |

\* cited by examiner

*Primary Examiner*—Sarah Song
(74) *Attorney, Agent, or Firm*—The Webb Law Firm

(57) ABSTRACT

Disclosed herein is a wavelength division multiplexing device. The wavelength division multiplexing device includes a first optical circulator and a Fiber Bragg Grating (FBG). The first optical circulator has a first plurality of ports. The FBG is connected to one of the first plurality of ports of the first optical circulator to reflect or transmit some of the wavelength channels of an optical signal input to the first optical circulator. The FBG is a phase-sampled grating. In the phase-sampled grating, the refractive index of an optical fiber core is modulated by a predetermined chirp in a grating period and a predetermined chirp in a sampling period, and the chirps in the grating period and the sampling period are set to allow dispersion values of all wavelength channels, which are reflected in the FBG, to have a linear function relationship with wavelengths.

12 Claims, 17 Drawing Sheets

WAVELENGTH DIVISION MULTIPLEXING DEVICE CAPABLE OF COMPENSATING FOR DISPERSION AND DISPERSION SLOPE USING PURELY PHASE-SAMPLED FIBER BRAGG GRATING

BACKGROUND OF THE INVENTION

1. Field of the Invention

The present invention relates generally to a wavelength division multiplexing device having a function of compensating for the dispersion that occurs while optical pulses propagate along optical fiber, and, more particularly, to a wavelength division multiplexing device including a fiber Bragg grating for compensating for dispersion.

2. Description of the Related Art

In the present invention described below, the term "wavelength division multiplexing device" is used as a concept, including an Add-Drop Multiplexer (ADM) for selectively adding/dropping specific wavelength channels to/from input wavelength channels and an interleaver for dividing input wavelength channels in two and outputting the resulting wavelength channels.

An ADM is a core component of an optical communication system that is used to perform Wavelength Division Multiplexing (WDM). Various methods may be used to construct an ADM, but, recently, a method of constructing an ADM by interposing a Fiber Bragg Grating (FBG) between two optical circulators has been proposed.

In an ADM using the above-described FBG, the FBG can be produced by varying the refractive index in optical fiber at regular intervals. Methods of varying a refractive index include amplitude sampling and phase sampling. For reference, the variation of the refractive index of an amplitude-sampled FBG within an optical fiber core is shown in FIG. 1. In FIG. 1, the x-axis represents the length of the optical fiber and the y-axis represents the refractive index of the optical fiber. It can be understood from the FBG of FIG. 1 that grating spacings are the same, but the amplitude of the refractive index varies. A grating producing method shown in FIG. 1 is called "amplitude sampling" due to the above-described phenomenon. In contrast, a phase-sampled FBG is related to the case where grating spacings are the same and amplitude is constant.

Methods of manufacturing the above-described amplitude-sampled FBG and phase-sampled FBG are well known in the technical field to which the present invention pertains. Of the manufacturing methods, a phase masking method is widely used. FIG. 2 shows a grating manufacturing method based on the phase mask method. As shown in FIG. 2, when a laser beam 11 generated by a laser source 10 is irradiated onto optical fiber 40 through a phase mask 30 in which a specific pattern is formed, the refractive index of the regions of the optical fiber 40, onto which the laser beam is irradiated in conformity with the pattern, varies. In this method, a mirror 20 for reflecting the laser beam 11 is moved to allow the laser beam 11 to irradiate specific portions of the optical fiber along the phase mask 30. At this time, when the moving speed of the mirror 20 varies, an amplitude-sampled grating can be produced. When the moving speed of the mirror 20 is made constant and the phase mask is appropriately laterally moved, a phase-sampled grating can be produced. In this case, the production of a grating in optical fiber is called index modulation.

Meanwhile, the above-described amplitude-sampled FBG is problematic in that index modulation must be increased in proportion to the number of channels. Since index modulation is obtained by the irradiation of a laser beam as described above, a larger amount of index modulation can be obtained through the longer irradiation of a laser beam. However, there is a limitation in varying a refraction index in optical fiber, so that the amplitude sampling has a limitation in that it cannot be applied to a wavelength division multiplexing device having a large number of channels.

In the meantime, the transmission of optical signals through optical fiber is problematic in that the dispersion of an optical signal occurs. For normal fiber at 1550 nm, a short wavelength optical fiber has a short delay time, while a long wavelength optical fiber has a long delay time. Delay time has characteristics of varying non-linearly depending on wavelength. Accordingly, to fully compensate for such non-linear dispersion characteristics, compensation for dispersion and a dispersion slope is required.

Loh et at. proposed a dispersion slope compensation method using amplitude-sampled FBGs in the thesis entitled "Sample fiber grating based-dispersion slope compensation" (IEEE photon., Technol. Lett., Vol. 11, No. 10, pp. 1280–1282).

However, the above-described document employs an interleaving technique with an increase in the number of wavelength channels by alternating amplitude-sampled FBGs to efficiently utilize the length of optical fiber. In this method, FBGs having a shape similar to that of phase-sampled FBGs are used by completely eliminating the intervals between the amplitude-sampled FBGs, or a plurality of amplitude-sampled FBGs, which functions independently because the Bragg wavelengths of the amplitude-sampled FBGs are sufficiently spaced apart from each other, are used.

SUMMARY OF THE INVENTION

Accordingly, the present invention has been made keeping in mind the above problems occurring in the prior art, and an object of the present invention is to provide a wavelength division multiplexing device that is capable of compensating for dispersion and a dispersion slope using a purely phase-sampled FBG.

Another object of the present invention is to provide a wavelength division multiplexing device that is capable of decreasing deviations in WDM channel bandwidths while compensating for dispersion and a dispersion slope using a purely phase-sampled FBG.

In order to accomplish the above object, the present invention provides a wavelength division multiplexing device, including a first optical circulator having a first plurality of ports; and an FBG connected to one of the first plurality of ports of the first optical circulator to reflect or transmit some of wavelength channels of an optical signal input to the first optical circulator; wherein the FBG is a phase-sampled grating, in which a refractive index of an optical fiber core is modulated by a predetermined chirp in a grating-period and a predetermined chirp in a sampling period, and the chirps in the grating period and the sampling period are set to allow dispersion values of all wavelength channels, which are reflected in the FBG, to have a linear function relationship with wavelengths.

According to another embodiment of the present invention, the present invention provide a wavelength division multiplexing device, including a first optical circulator having a first plurality of ports; and an FBG connected to one of the first plurality of ports of the first optical circulator to reflect or transmit some of the wavelength channels of an optical signal input to the first optical circulator; wherein the FBG is a phase-sampled grating, in which the refractive index of an optical fiber core is modulated by a predetermined chirp in a grating period and a predetermined chirp in a coupling coefficient, and the chirps in the grating period and the coupling coefficient are set to allow the dispersion values of all wavelength channels, which are reflected in the FBG, to have a linear function relationship with wavelengths.

In the present invention, the coupling coefficient is expressed by the following equation, $$\kappa_m = \pi \Delta n_1 F_m / \lambda_B$$

where $\Delta n_1$ is a modulation amplitude constant, $\lambda_B$ is a Bragg wavelength, and $F_m$ is a Fourier coefficient that is used to express a phase sampling function $\phi(z)$ in terms of a refractive index of the FBG using the following equation, $$n(z) = n_0 + \Delta n_1 \text{Re}\{\exp[i(2\beta_0 z + \phi(z))]\}$$
$$= n_0 + \Delta n_1 \text{Re}\left\{\sum_m F_m \exp[2i(\beta_0 + m\beta_s)z]\right\}$$

wherein $n_0$ is an average refractive index, $\beta_0 = \pi/\Lambda_0$, $\beta_s = \pi/\Lambda_s$, $\Lambda_0$ is an average grating period and $\Lambda_s$ is a period of a sampling function.

According to another embodiment of the present invention, the present invention provide a wavelength division multiplexing device, including a first optical circulator having a first plurality of ports; and an FBG connected to one of the first plurality of ports of the first optical circulator to reflect or transmit some of the wavelength channels of an optical signal input to the first optical circulator; wherein the FBG is a phase-sampled grating, in which the refractive index of an optical fiber core is modulated by a predetermined chirp in a grating period, a predetermined chirp in a sampling period and a predetermined chirp in a coupling coefficient, and the chirps in the grating period, the sampling period and the coupling coefficient are set to allow the channel bandwidths of all wavelength channels, which are reflected in the FBG, to be substantially identical to each other.

In the present invention, the wavelength division multiplexing device further includes a second optical circulator having a second plurality of ports, the second optical circulator being optically connected to the FBG to extract one or more channels passing through the FBG and to add one or more wavelength channels, which are input through any of the second plurality of ports, to the wavelength channels reflected in the FBG.

In the present invention, by designing the FBG so that it alternately reflects the wavelength channels of the optical signal input to the first optical circulator, the wavelength division multiplexing device can be used as an interleaver.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
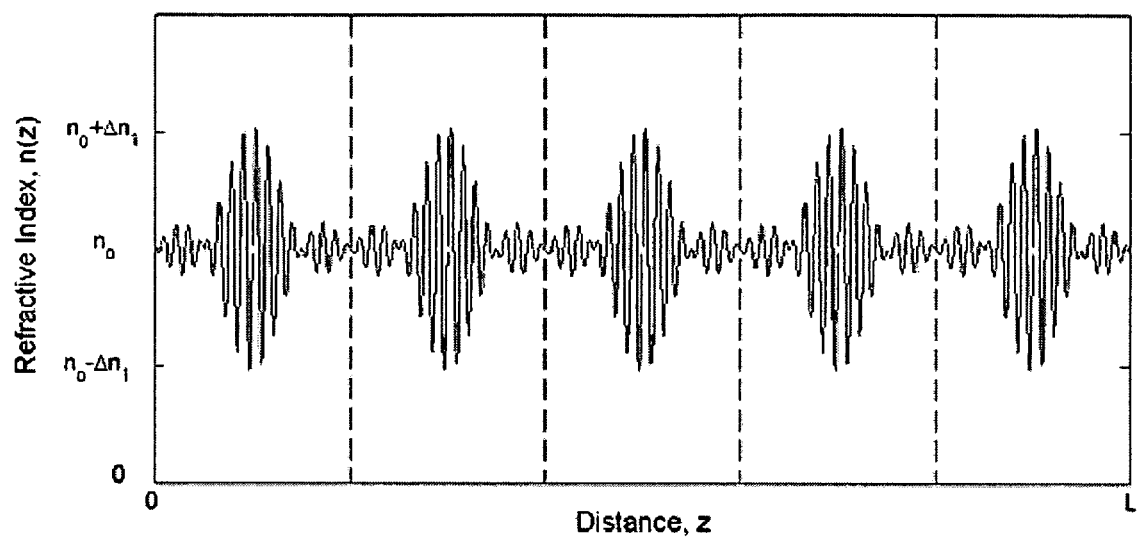
FIG. 1 is a graph showing the variation of a refractive index within the optical fiber core of a conventional amplitude-sampled FBG.
Figure 2:
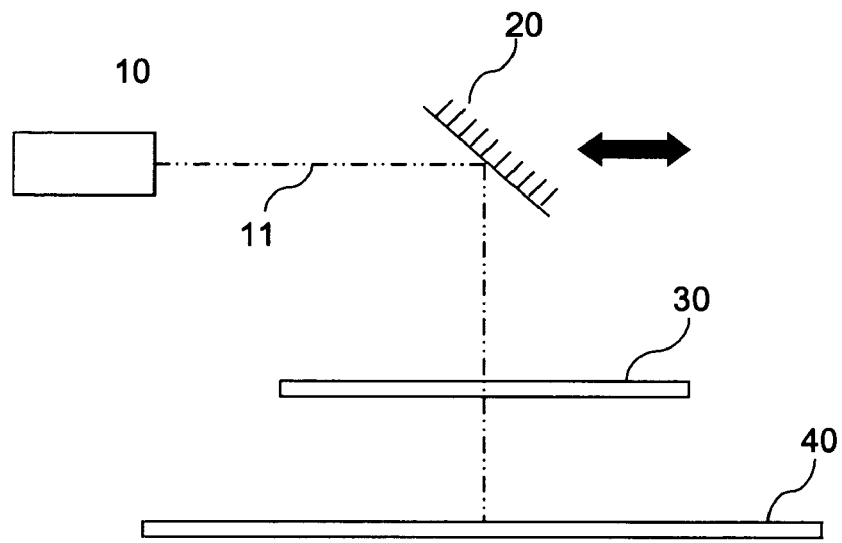
FIG. 2 shows a grating manufacturing method based on the phase mask method.

Reference now should be made to the drawings, in which the same reference numerals are used throughout the different drawings to designate the same or similar components.

Figure 3:
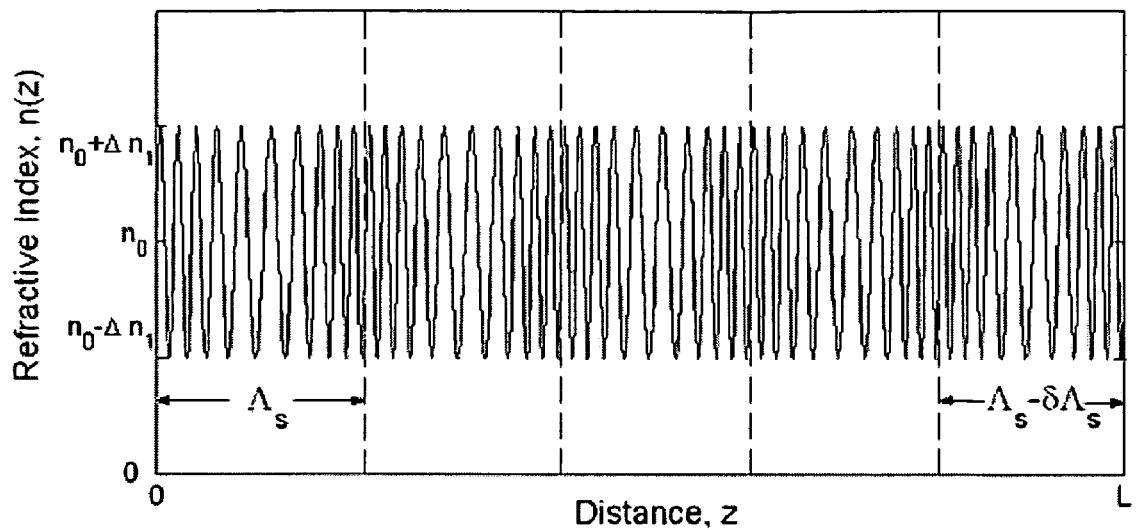
FIG. 3 is a graph showing the variation of a refractive index within a phase-sampled FBG that is used in a wavelength division multiplexing device.

FIG. 3 is a graph showing the variation of a refractive index within the optical fiber core of a phase-sampled FBG that is used in a wavelength division multiplexing device. In FIG. 3, the x-axis represents the lengthwise direction of a grating, while the y-axis represents the refractive index. As shown in FIG. 3, in the direction of moving away from an origin, a sampling period $\Lambda_s$ decreases at a specific rate. FIG. 3 shows that the final sampling period decreases by $\delta\Lambda_s$ compared to the initial sampling period $\Lambda_s$. In the present invention, $\delta\Lambda_s$ may vary according to the type of optical fiber, dispersion characteristics and the number of wavelength channels.

Although, in FIG. 3, the case where $\delta\Lambda_s$ has a negative value has been taken as an example, $\delta\Lambda_s$ may have a positive value according to the type of optical fiber. In considering of the type of optical fiber, fiber length, dispersion characteristics and the number of wavelength channels, the appropriate absolute value of $\delta\Lambda_s$ preferably falls within a range of approximately 0.1 to 7% of the initial sampling period $\Lambda_s$.

The refractive index of optical fiber core, as shown in FIG. 3, is designed through the following steps.

An effective mode index within an optical fiber core can be expressed by the following Equation, $$n(z) = n_0 + \Delta n_1 \text{Re}\{\exp[i(2\beta_0 z + \phi(z))]\} \quad (1)$$
$$= n_0 + \Delta n_1 \text{Re}\left\{\sum_m F_m \exp[2i(\beta_0 + m\beta_s)z]\right\}$$

where $n_0$ is the average refractive index, $\Delta n_1$ is the modulation amplitude constant, and $\phi(z)$ is the phase sampling function. Furthermore, $\beta_0 = \pi/\Lambda_0$, $\beta_s = \pi/\Lambda_s$, $\Lambda_0$ is the average grating period and $\Lambda_s$ is the period of a sampling function.

The phase sampling period $\Lambda_s$ generates a periodic reflection spectrum $R_g(\nu)$ at a channel spacing of $\Delta\nu = c/(2n_0\Lambda_s)$ on a frequency axis, and the actual shape of the sampling function $\phi(z)$ determines the peak reflectivity $R_p$ for each channel. In this case, the peak reflectivity is preferably the same for all the channels. For this purpose, a phase profile should be designed appropriately. A process of designing the phase profile is described below.

$$R_p = \sum_m R_m = \sum_m \tan h^2(|\kappa_m|L) \quad (2)$$

where the coupling coefficient $\kappa_m$ is $\pi\Delta n_1 F_m/\lambda_B$ and is linearly proportional to the Fourier coefficient $F_m$ of Equation 1. In this case, the Bragg wavelength $\lambda_B$ is defined as $2n_0\Lambda_0$.

Subsequently, a multi-dimensional minimization algorithm available in the Matlab package is employed to allow the peak reflectivity, which is defined by Equation 2, to be the same for all Wavelength-Division Multiplexing (WDM) channels. Of course, algorithms and software other than the algorithm described in the present invention may be employed.

First, the sampling period $\Lambda_s$ is divided into a plurality of segments to discretize a phase function. Thereafter, partial reflectivities $R_m$ corresponding to the Fourier coefficients of Equation 1, and the mean-square deviation T of the calculated partial reflectivities $R_m$ from a certain constant value $R_0$ is calculated using the following equation, $$T = \frac{1}{M}\sum_{m=1}^{M} W_m(R_m - R_0)^2 \quad (3)$$

where $W_m$ is a weighting factor.

The phase sampling function, which minimizes the mean-square deviation T, is obtained by performing iterative calculation while varying the value of the phase sampling function $\phi(z)$.

Figure 4A:
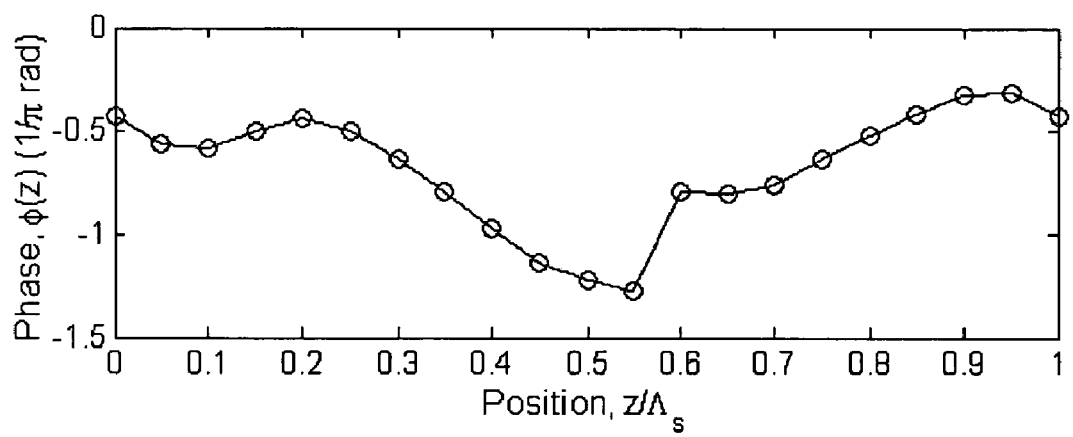
FIG. 4A is a graph showing an optimized phase profile obtained using twenty segments in accordance with the present invention.
Figure 4B:
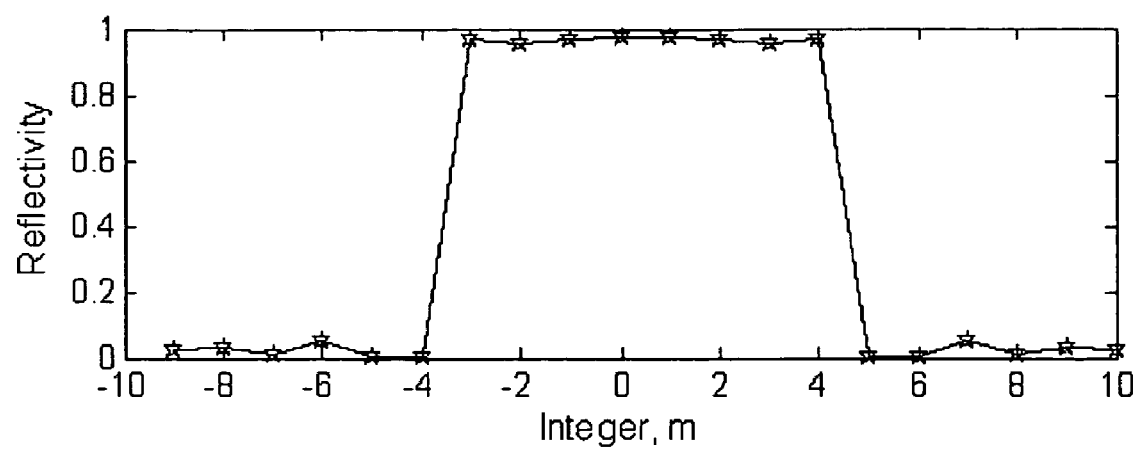
FIG. 4B is a graph showing peak reflectivity obtained using the phase profile of FIG. 1.

FIG. 4A is a graph showing the profile of the optimized phase sampling function obtained using twenty segments according to the above-described method. FIG. 4B is a graph showing peak reflectivity obtained using the phase profile of FIG. 1, which shows that the peak reflectivity is constant over eight wavelength division multiplexing channels.

Figure 5A:
FIGS. 5A to 5C are graphs showing a reflection spectrum, delay time and dispersion at WDM channel wavelengths calculated for the phase profile of FIG. 4A, respectively.
Figure 5B:
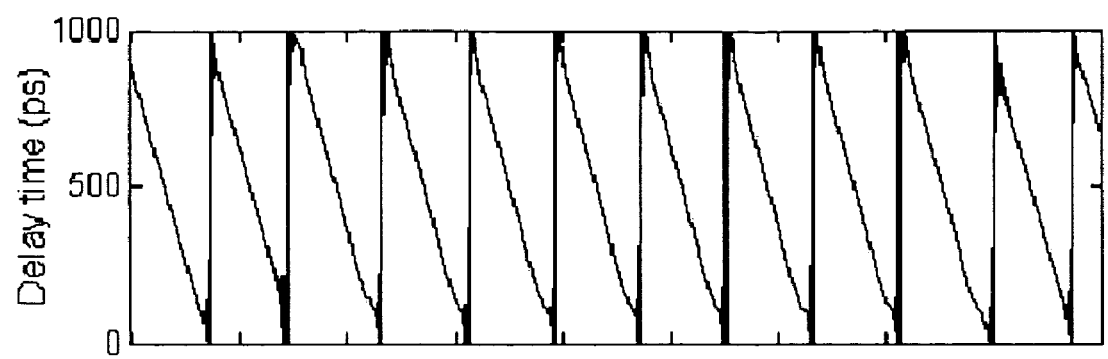
Figure 5C:
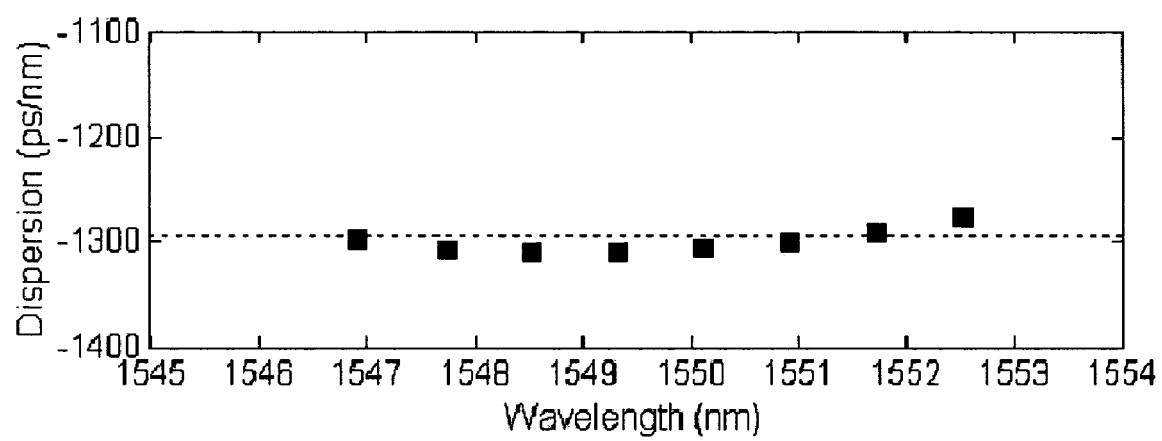

FIGS. 5A to 5C are graphs showing a reflection spectrum $R_g(\nu)$, delay time ($\tau$) and dispersion (D) over all the wavelength channels calculated for the phase profile of FIG. 4A using a transfer-matrix approach, respectively. In this case, the dispersion is defined as a value obtained by differentiating delay time with respect to a wavelength. In this calculation, a grating length L=10 cm, $\Delta n_1 = 4\times 10^{-4}$, and $\Lambda s = 1$ mm are used as grating parameters. A chirp in a grating period, which varies at a rate of approximately $\delta\Lambda_0 = 0.08$ nm/cm, is used as the grating period.

The transfer-matrix approach used in the present invention is well known in the field to which the present invention pertains. For example, the thesis of Erdogan, "Fiber Grating Spectra," Journal of Lightwave Technology, Vol. 15, pp. 1277–1294, discloses a method of calculating reflection and transmission spectra using the transfer-matrix approach.

In accordance with the method, when an optical fiber grating is divided into M uniform sections and $R_i$ and $S_i$ are amplitudes after a wave has traveled the interval i, the amplitudes of the wave, which has traveled a uniform portion of the optical fiber grating, are expressed by the following equation, $$\begin{bmatrix} R_i \\ S_i \end{bmatrix} = F_i \begin{bmatrix} R_{i-1} \\ S_{i-1} \end{bmatrix} \quad (4)$$

where $F_i$ is the i-th Bragg grating matrix that is obtained from the above-described phase profile. In this case, the amplitude of the output of all the optical fiber gratings is expressed by the following equation, which is expressed by the product of the Bragg grating matrices of individual sections.

$$\begin{bmatrix} R_M \\ S_M \end{bmatrix} = F \begin{bmatrix} R_0 \\ S_0 \end{bmatrix} \quad (5)$$

where $F = F_M \cdot F_{M-1} \cdots F_i \cdots F_1$

In this case, the number of sections M is determined to appropriately determine the length of the sections so that the individual sections have sufficiently uniform characteristics.

When $S_M/R_M$ is calculated from Equation 5, the square of the absolute value of $S_M/R_M$ is a reflective coefficient, and the delay time is calculated from the phase of the reflective coefficient.

Referring to FIGS. 5A to 5C again, it can be appreciated from FIG. 5C that the dispersion D is constant regardless of reflection channel. Consequently, the dispersion slope $(S=dD/d\lambda)$ cannot be compensated for by such an FBG.

In the present invention, to compensate for the dispersion slope S, a chirp in the sampling period $\Lambda_s$ is additionally employed. A required chirp is dependent on the dispersion slope S of the optical fiber used to perform wavelength-division multiplexing channel transmission, and can be expressed by the following equation, $$\delta\Lambda_s = (S/D)\Lambda_s \Delta\lambda_{ch} \qquad (6)$$

where $\Delta\lambda_{ch}$ is a channel spacing.

As described above, the grating period $\Lambda_0$ and the sampling period $\Lambda_s$ are employed to produce the FBG of the present invention, so that these two chirps need to be optimized. In the optimization of the two chirps, the relative dispersion slope S/D must match most of the optical fibers.

Figure 6A:
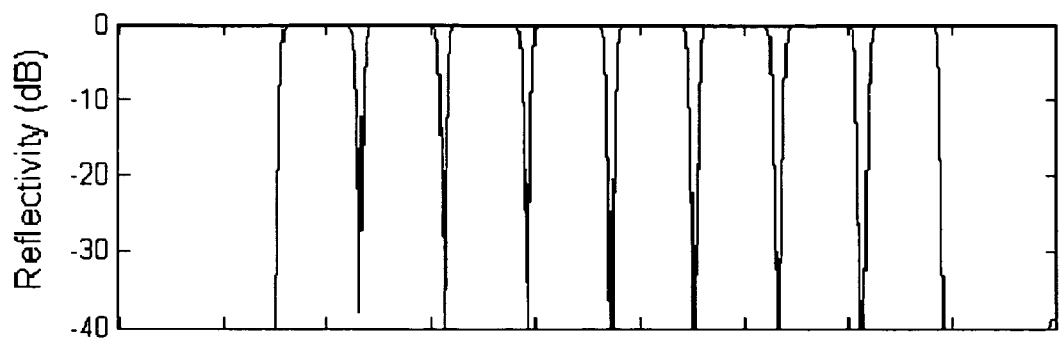
FIGS. 6A to 6C are graphs showing a reflection spectrum, delay time and dispersion at WDM channel wavelengths calculated using an FBG having a chirp in a sampling period in accordance with the present invention, respectively.
Figure 6B:
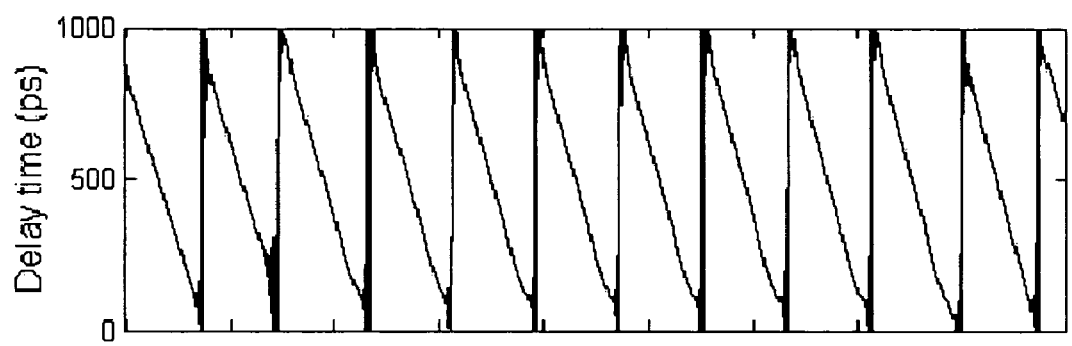
Figure 6C:
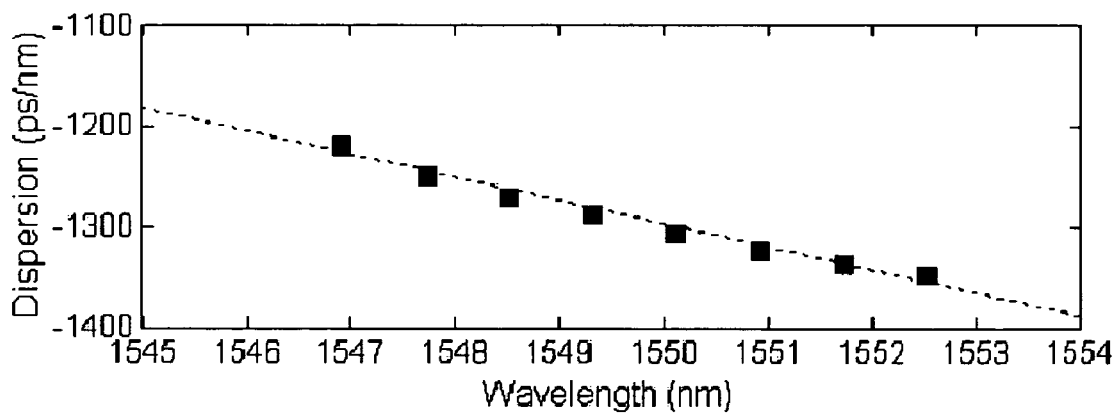

FIGS. 6A to 6C are graphs showing a reflection spectrum, delay time and dispersion calculated under conditions identical to those of FIGS. 5A to 5C except that a sampling period is chirped so that $\delta\Lambda_s/\Lambda_s = 1.5\%$, respectively.

It can be appreciated from FIGS. 6A to 6C that light reflected by the FBG of the present invention has a short delay time at a long wavelength, the light has a long delay time at a short wavelength, and the dispersion slope has a linear function relationship with the wavelength. The dispersion compensation characteristics of the FBG of the present invention are suitable for application to a wavelength division multiplexing device having a plurality of wavelength channels. The reason for this is that, as the number of channels used in the wavelength division multiplexing device becomes large, the dispersion characteristics of the optical fiber have a higher order function. The dispersion and dispersion slope use to be compensated in practical use.

In consideration of the above-described fact, the characteristics of the reflective channel obtained by the chirped phase-sampled FBG of the present invention exhibit delay time characteristics and dispersion slope characteristics opposite to the dispersion characteristics of the optical fiber. As a result, the dispersion generated by an optical signal transmitted to the wavelength division multiplexing device can be accurately compensated for.

An embodiment of implementing the ADM using the above-described principle of the present invention is described below.

Figure 7:
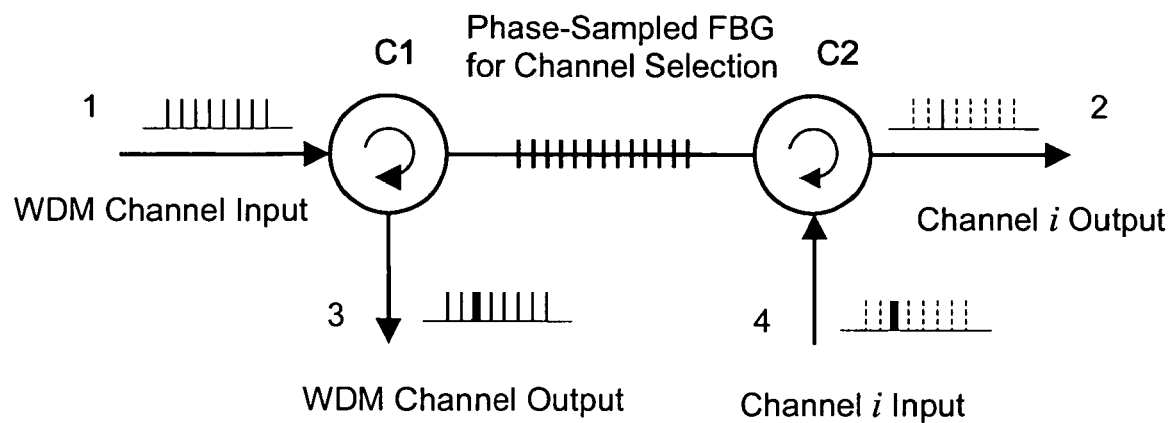
FIG. 7 is a diagram showing the construction of an ADM that is an embodiment of the wavelength division multiplexing device of the present invention.

FIG. 7 is a diagram showing an ADM according to an embodiment of the present invention.

Referring to FIG. 7, the ADM of the present invention includes two three-port optical circulators and a single chirped phase-sampled FBG.

As shown in FIG. 7, in the present embodiment, the phase-sampled FBG of the present embodiment reflects all channels, which are input from a first port 1, except the dropped channel, to a third port 3. The dropped channel Channel i is output through a second port 2. Meanwhile, the FBG of the present invention may add the same wavelength channel Channel i, which is input through a fourth port, to the reflected light wavelength channels that are output through the third port 3. FIG. 3 shows that the same wavelength channel, which is input through the fourth port 4, has been added to the channels that are output through the third port 3.

In the present invention, the phase-sampled FBG is provided with gratings to compensate for the dispersion characteristics of the optical fiber in accordance with the principle of the present invention.

The phase profile for the phase-sampled FGB reflecting all eight channels that are input as shown in FIGS. 5A to 5C, except the i-th channel, is obtained using the above-described equation and the multi-dimensional minimization algorithm. That is, the FBG is designed so that the reflectivity for the i-th of all the wavelength channels is zero and the reflectivity for the remaining channels is one.

Figure 8A:
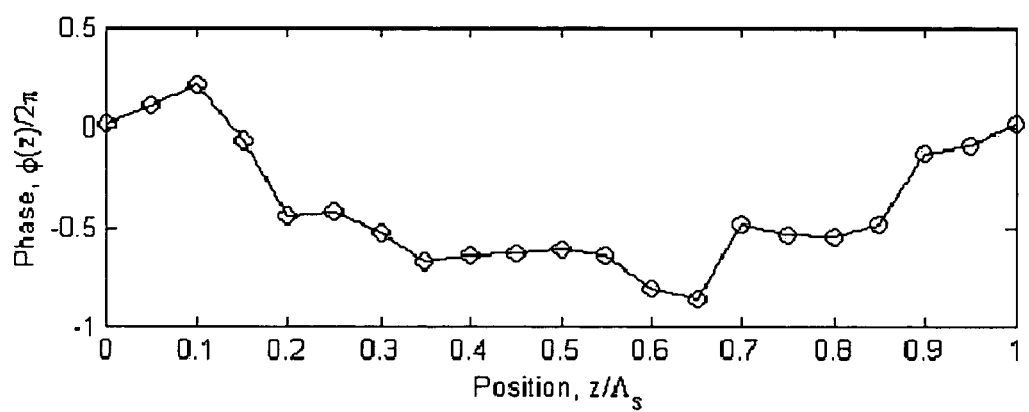
FIG. 8A is a graph showing a phase profile that is optimized to add/drop the second of eight input channels so as to be suitable for the ADM of FIG. 7.
Figure 8B:
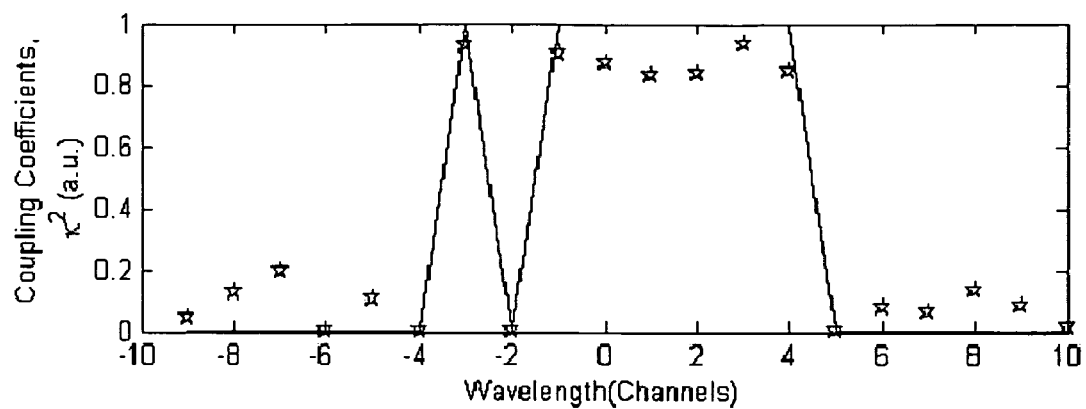
FIG. 8B is a graph showing peak reflectivity obtained using the phase profile of FIG. 8A.

FIG. 8A is a graph showing a phase profile obtained using such a method, which shows the phase profile that is optimized to add/drop the second of eight input channels. FIG. 8B is a graph showing peak reflectivity obtained using the phase profile, which shows that the reflectivity for the second channel is zero and the reflectivity for the remaining channels is one.

Figure 9A:
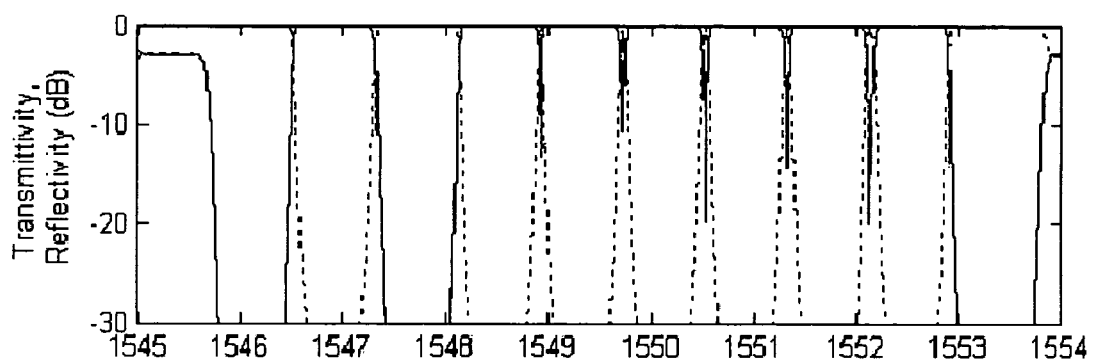
FIGS. 9A to 9C are graphs showing transmitivity and reflectivity spectra, delay time and dispersion at individual channel wavelengths for the phase profile shown in FIG. 8A using the transfer-matrix approach, respectively.
Figure 9B:
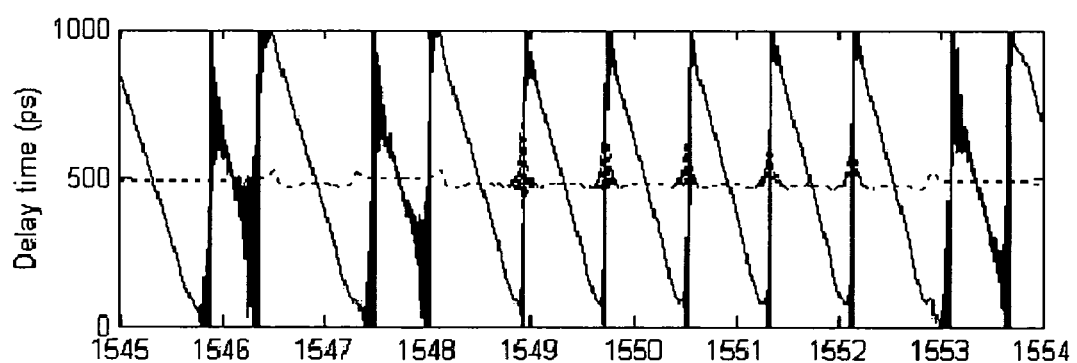
Figure 9C:
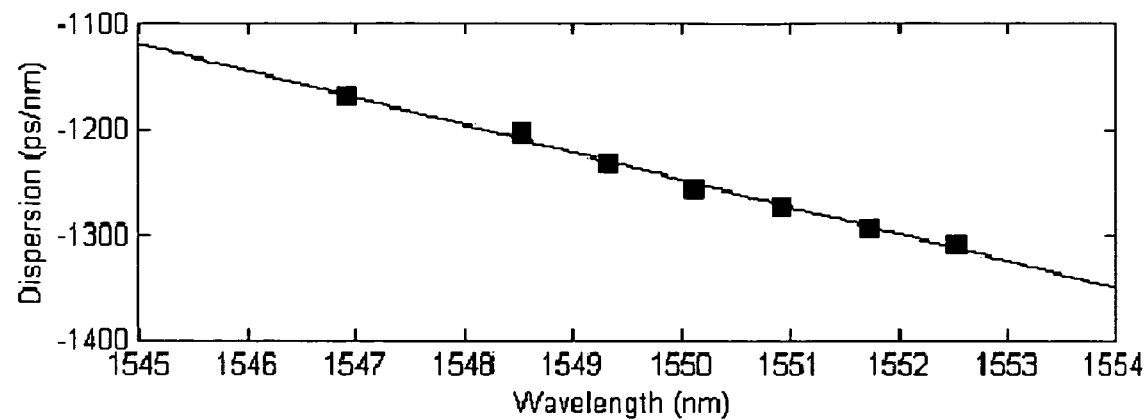

FIGS. 9A to 9C are graphs showing transmitivity and reflectivity spectra, delay time and dispersion at individual channel wavelengths for the phase profile shown in FIG. 8A using the transfer-matrix approach, respectively. In this case, L=10 cm, $\Delta n_1 = 3 \times 10^{-4}$, and $\Lambda_s = 1$ mm are used as grating parameters, and $\delta\Lambda_0 = 0.08$ nm/cm is used as a chirp in a grating period. In the present embodiment, to compensate for the dispersion slope, the chirp in the grating period is used so that $\delta\Lambda_s/\Lambda_s = 1.7\%$ at the end of the grating. Of course, the chirp in the grating period can be changed to an appropriate value according to parameters, such as the type of optical fiber, dispersion characteristics and the number of wavelength channels.

The solid lines of FIG. 9A represent a reflectivity spectrum, while the dotted lines of FIG. 9A represent a transmitivity spectrum. It can be appreciated from FIG. 9B that the delay time (indicated by the dotted lines) of the transmitted channel is constant regardless of wavelength, the delay time (indicated by the solid lines) of the reflected channel varies linearly depending on a wavelength, and the slope of the delay time varies with the reflected channel. FIG. 9C is a graph showing dispersion values obtained by differentiating the delay time of FIG. 9B with respect to the wavelength to appreciate the variation of the delay time depending on the wavelength of the reflected channel over the entire wavelength band. As illustrated in FIG. 9C, the wavelength and the dispersion have a linear function relationship with each other. Accordingly, it can be appreciated that the ADM of the present invention cannot only perform the addition/deletion of a channel, but also can compensate for the dispersion slope of the optical fiber.

In the foregoing description, it has been described that the dispersion and dispersion slope of the ADM could be compensated for by generating the chirp in the grating period and the chirp in the sampling period in the purely phase-sampled FBG, with reference to FIGS. 7 to 9.

However, compensation for the dispersion and the dispersion slope can be achieved by a chirp in a coupling coefficient, which is described below.

Equation 2 shows that the peak reflectivity can be quantitatively expressed by the function of a coupling coefficient where the coupling coefficient $\kappa_m$ is expressed by $\kappa_m = \pi\Delta_1 F_m/\lambda_B$.

In accordance with the above-described equation, the coupling coefficient is the function of the Fourier coefficient $F_m$, so that the chirp in the coupling coefficient can be generated by varying the Fourier coefficient.

Figure 10A:
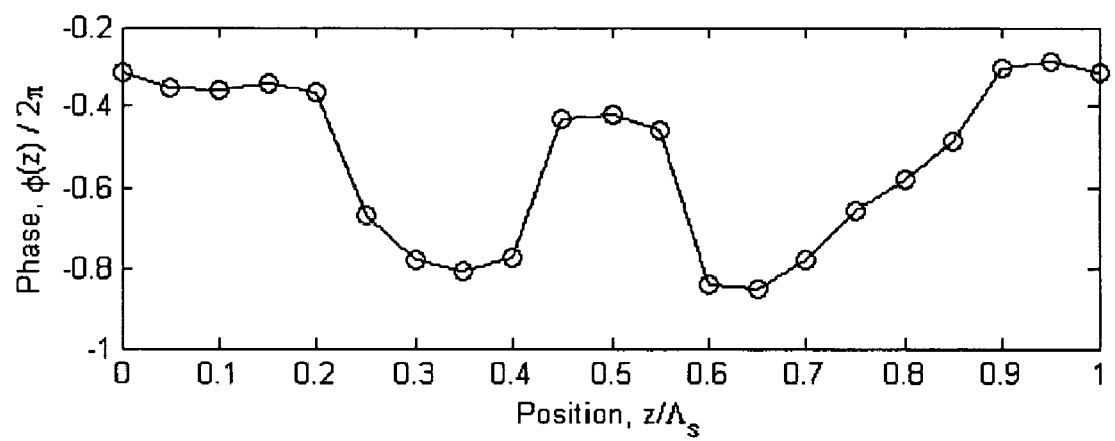
FIGS. 10A and 10B are graphs showing a phase profile optimized using twenty samples to compensate for the dispersion and the dispersion slope using the chirp in the coupling coefficient, and the coupling coefficients obtained from the phase profile, respectively.
Figure 10B:
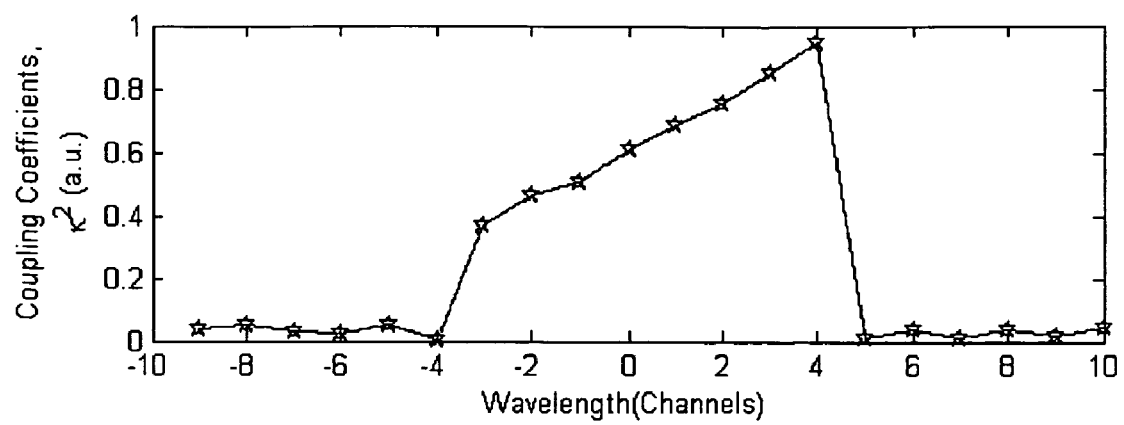

FIGS. 10A and 10B are graphs showing a phase profile optimized using twenty samples to compensate for the dispersion and the dispersion slope using the chirp in the coupling coefficient, and the coupling coefficients obtained from the phase profile, respectively.

Figure 11A:
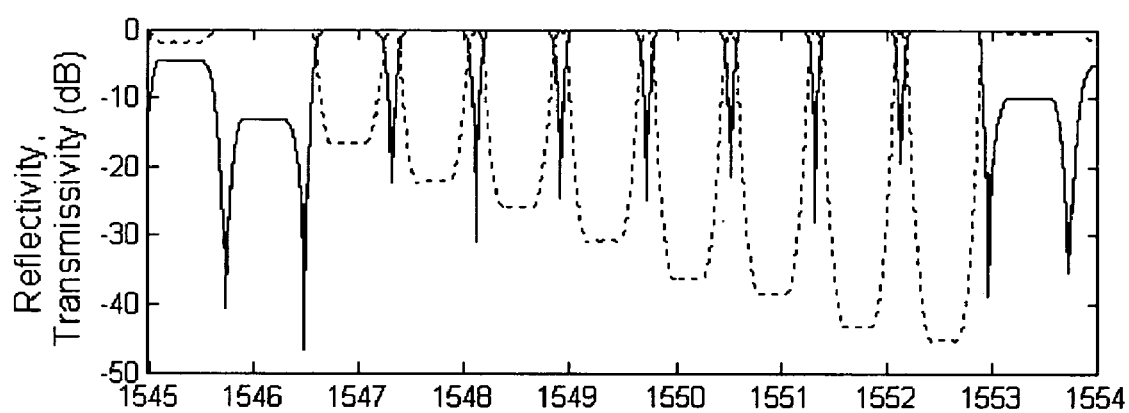
FIGS. 11A to 11C are graphs showing transmissivity and reflectivity spectra, delay time and dispersion obtained by performing simulation on the phase profile of FIG. 10A using the transfer-matrix approach, respectively.
Figure 11B:
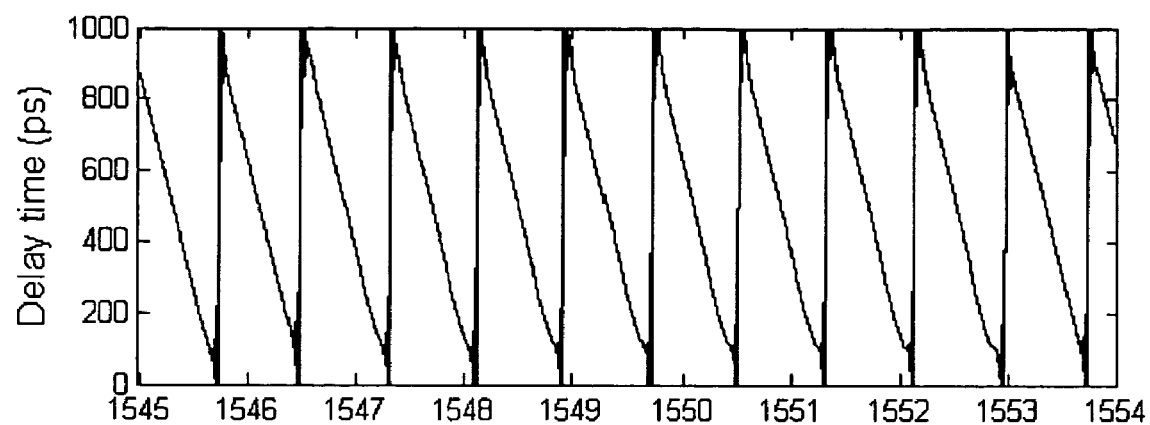
Figure 11C:
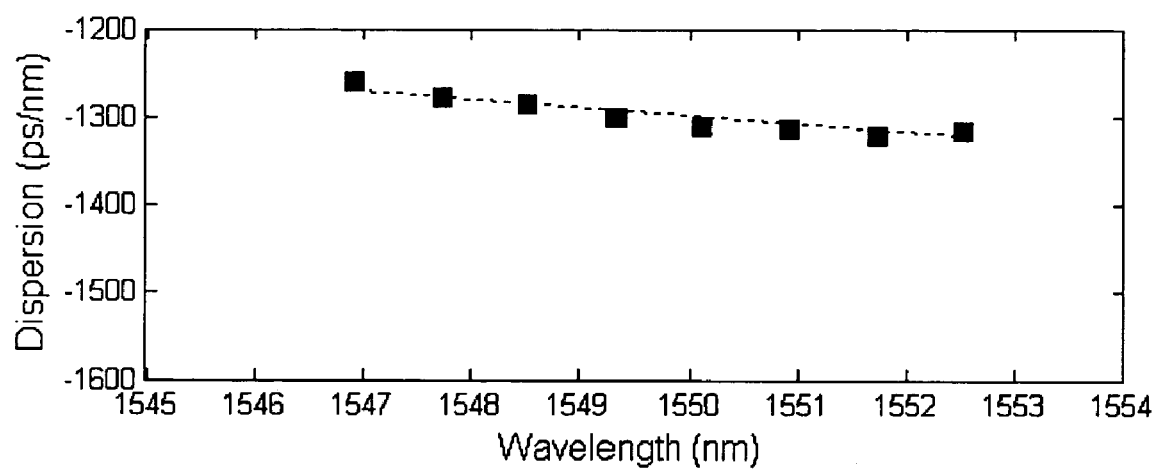

FIGS. 11A to 11C are graphs showing transmissivity and reflectivity spectra, delay time and dispersion obtained by performing simulation on the phase profile of FIG. 10A using the transfer-matrix approach, respectively. In this case, the grating parameters used in the calculation are L=10 cm, $\Delta n_1 = 4 \times 10^{-11}$, $\delta \Lambda_0 = 0.08$ nm/cm and $\Lambda_s = 1$ mm.

It can be appreciated from FIG. 11A that the transmissivity shows a decreasing tendency at a long wavelength channel. Furthermore, it can be appreciated from FIG. 11C that the dispersion takes a form similar to the form of a linear function and the slope of the dispersion is approximately 10.1 ps/nm².

FIG. 12 is a graph showing results obtained by performing simulation under conditions identical to those of the simulation of FIG. 11 except that $\Delta n_1 = 7 \times 10^{-11}$.

Figure 12A:
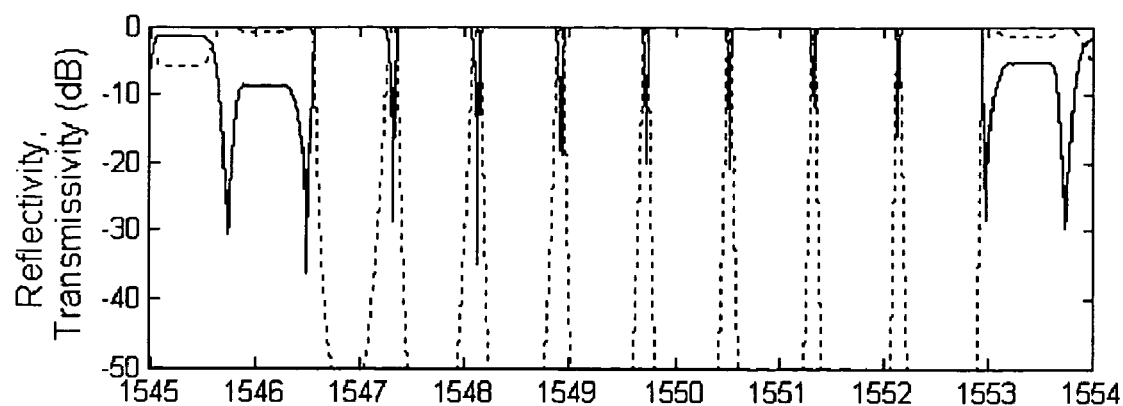
FIGS. 12A to 12C are graphs showing simulation results performed using parameters different from those of FIG. 11.
Figure 12B:
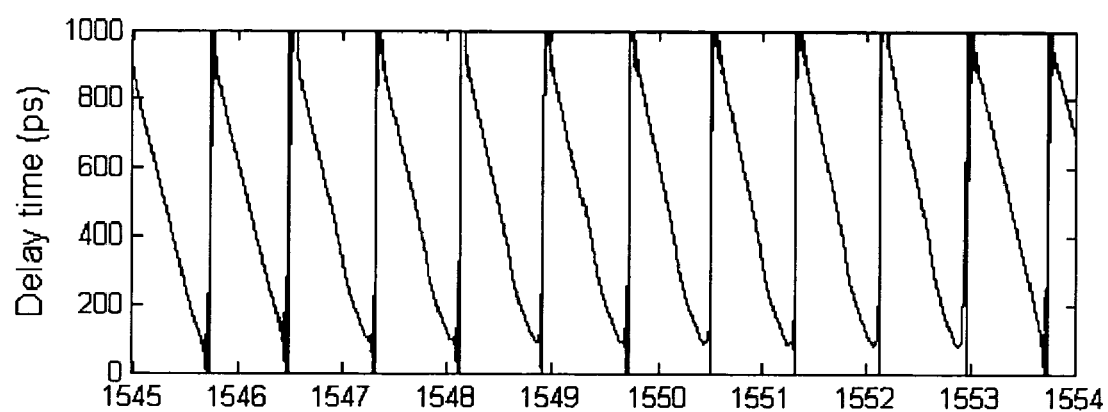
Figure 12C:
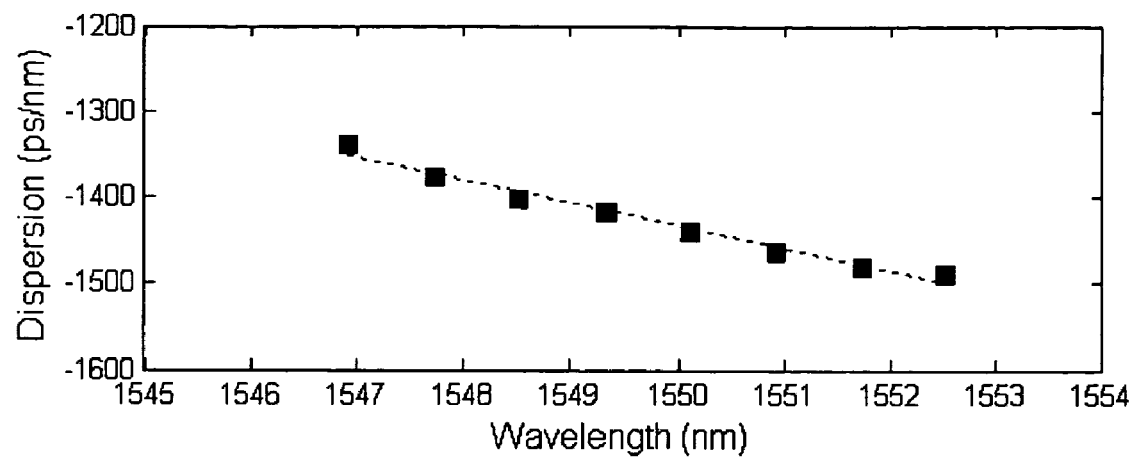

FIGS. 12A to 12C are graphs showing transmissivity and reflectivity spectra, delay time and dispersion, respectively.

It can be appreciated from FIGS. 12A to 12C that the transmissivity (indicated by solid lines) sufficiently decreases and, therefore, the chirp in the coupling coefficient scarcely influences the transmissivity. Furthermore, it can be appreciated from FIG. 12C that the dispersion for the wavelength takes a form similar to that of a linear function as in FIG. 11C and the slope of the dispersion is approximately 26.8 pa/nm².

As described above, the dispersion and the dispersion slope can be compensated for by the chirp in the coupling coefficient.

The principle of compensating for the dispersion and the dispersion slope using the purely phase-sampled FBG has been described above. The present inventors found a problem in which the bandwidth of the channel varies during the compensation for the dispersion and the dispersion slope in the above-described manner.

According to the observations of the present inventors, in the case of dispersion slope compensation using the chirp in the sampling period, the bandwidth of the long wavelength shows a decreasing tendency, and, in the case of dispersion slope compensation using the chirp in the coupling coefficient, the bandwidth of the long wavelength shows an increasing tendency.

However, when the chirp in the sampling period and the chirp in the coupling coefficient are generated at the same time, the dispersion and dispersion slope of WDM can be compensated for while a bandwidth remains almost constant over all the channels.

Figure 13A:
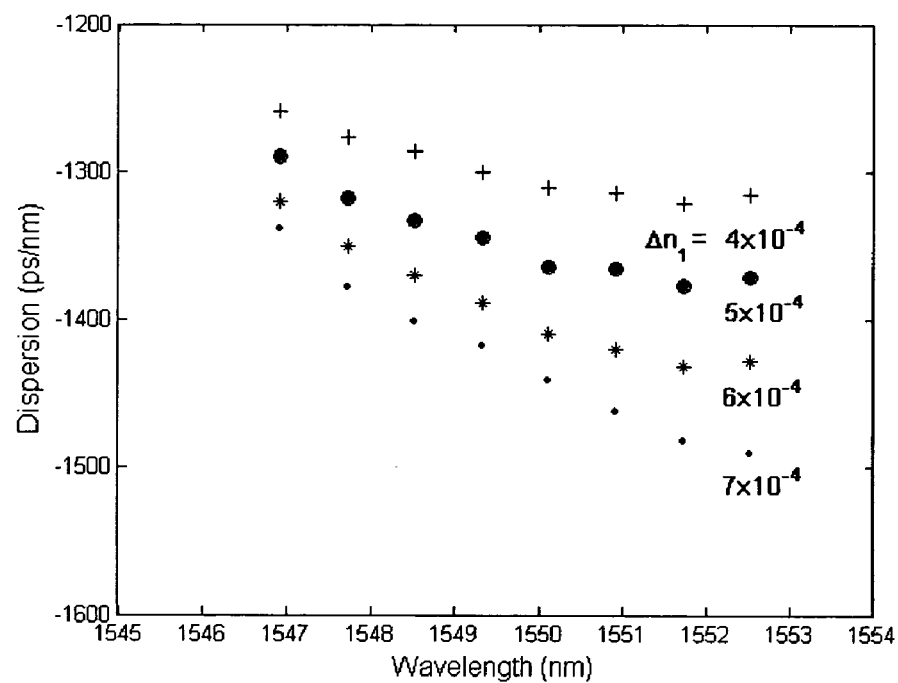
FIGS. 13A and 13B are graphs showing a dispersion slope and a channel bandwidth of individual WDM wavelength at several modulation amplitude constants when a chirp in a coupling coefficient is generated.
Figure 13B:
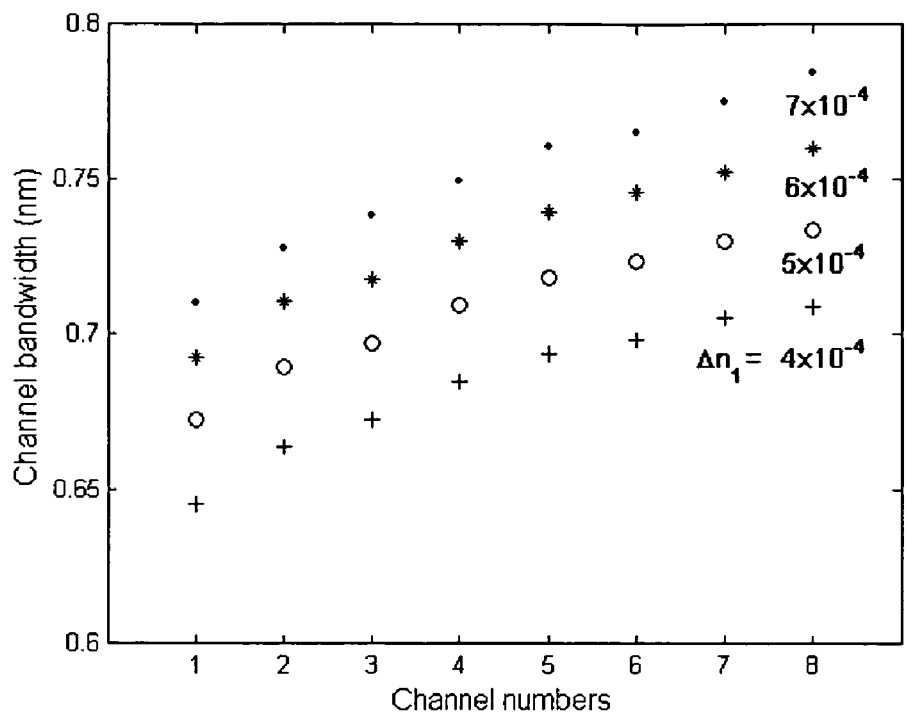

FIGS. 13A and 13B are graphs showing the variation of a dispersion slope and a channel bandwidth according to the variation of $\Delta n_1$ when a chirp in a coupling coefficient is generated. It can be appreciated that, as $\Delta n_1$ increases (that is, the coupling coefficient increases), negative dispersion increases and the channel bandwidth also increases.

Figure 14A:
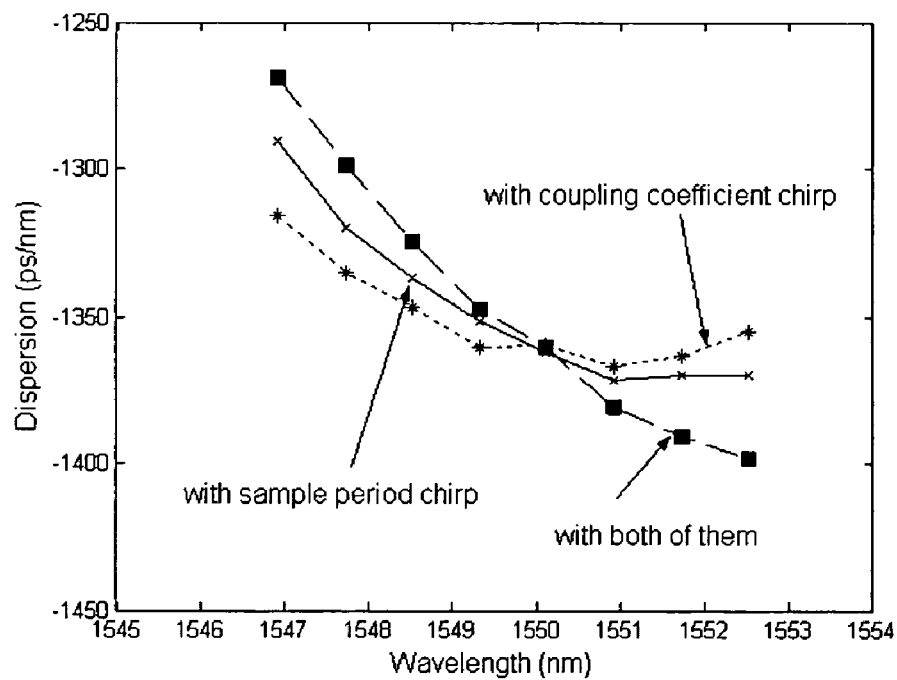
FIGS. 14A and 14B are graphs showing dispersion and a channel bandwidth of individual WDM wavelengths, respectively, when only a chirp in a sampling period is generated, only a chirp in a coupling coefficient is generated and both are generated.
Figure 14B:
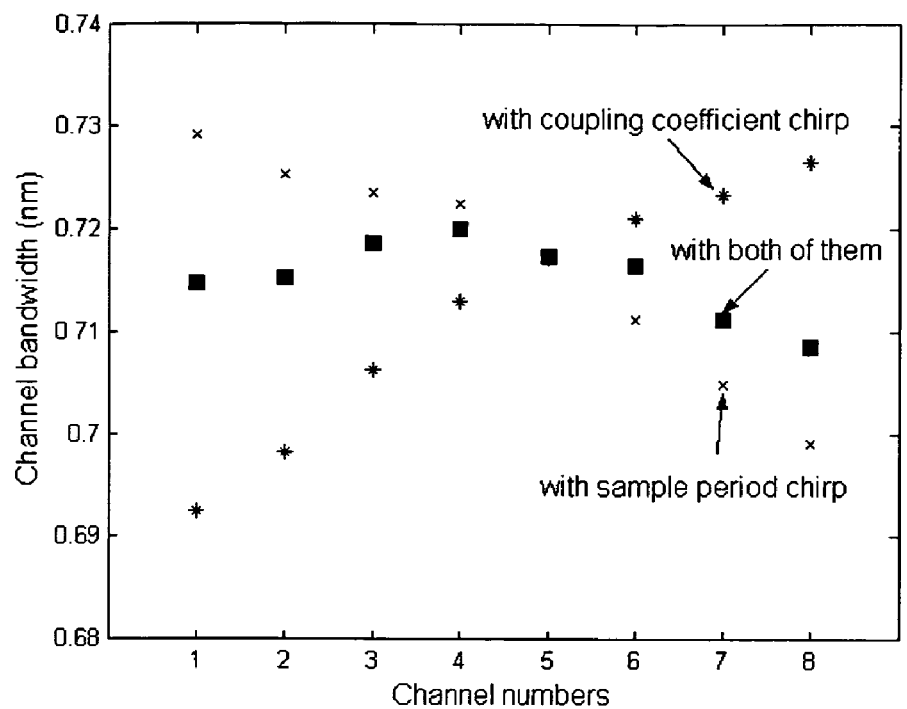

FIGS. 14A and 14B are graphs showing dispersion and channel bandwidths at individual wavelengths, respectively, when only a chirp in a sampling period is generated, only a chirp in a coupling coefficient is generated and both are generated. At this time, in the case of the chirp in the sampling period, $\delta \Lambda_s / \Lambda_s = 0.9\%$.

It can be appreciated from FIG. 14A that the case where both chirps exist shows a sharp dispersion slope compared to the case where a single chirp exists. Accordingly, when two chirps are used at the same time, the size of each chirp needs to be adjusted in conformity with the dispersion characteristics of the optical fiber. It can be appreciated from FIG. 14B that the variation of the channel bandwidth show opposite behaviors in the case where only the chirp in the sampling period or only the chirp in the coupling coefficient is generated, and the channel bandwidth becomes constant in the case where both chirps are used at the same time.

Figure 15A:
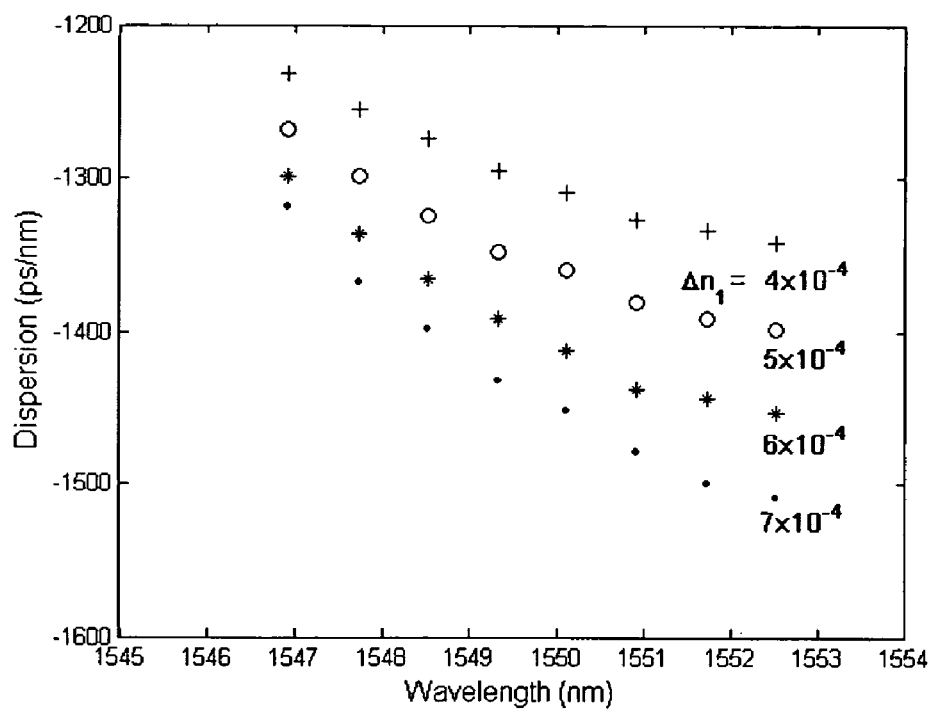
FIGS. 15A and 15B are graphs showing dispersion and a channel bandwidth of individual WDM wavelength at several modulation amplitude constants when the chirps in the coupling coefficient and the sampling period are generated at the same time, respectively.
Figure 15B:
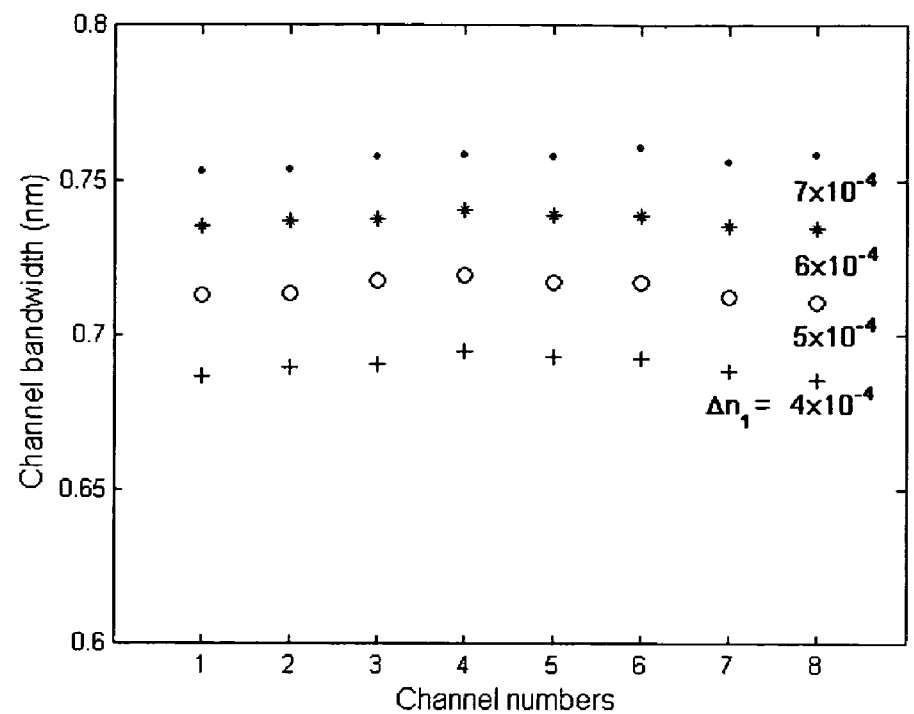

FIGS. 15A and 15B are graphs showing the variation of dispersion and a channel bandwidth according to the variation of a constant modulation amplitude when the chirps in the coupling coefficient and the sampling period are generated at the same time.

As described above, as the constant modulation amplitude increases, a negative dispersion value and a channel bandwidth increase. However, at each modulation amplitude constant, the bandwidth of all the channels is constant.

Although, in the above-described embodiment of the present invention, the ADM capable of adding/dropping one of the eight input channels has been chiefly described, the technical concept of the present invention, which aims at the compensation for the dispersion characteristics of the optical fiber, can be easily applied to the case where the number of wavelength channels increases.

Figure 16A:
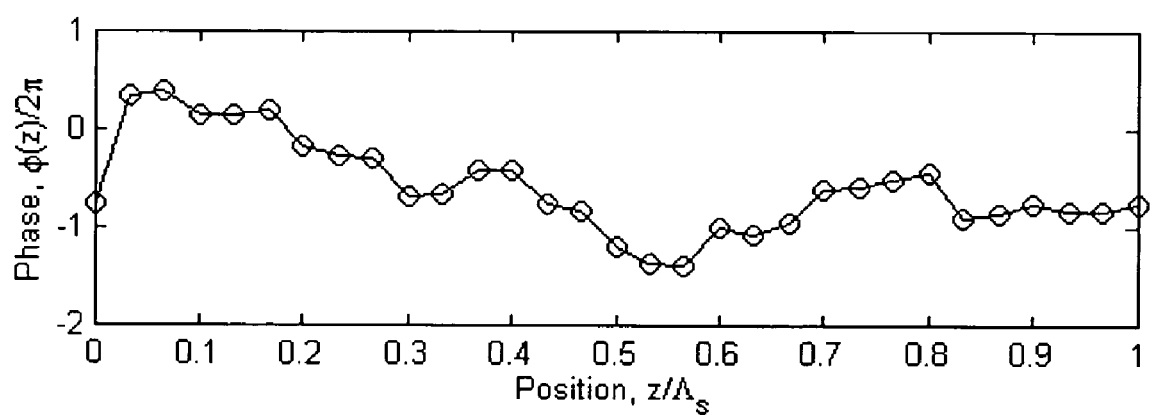
FIGS. 16A to 16C are graphs showing the phase profile, transmissivity and reflectivity spectra and dispersion of an ADM that is designed to allow the fourth, eleventh and sixteenth of sixteen input channels to be added/dropped so as to be suitable for the ADM of FIG. 7, respectively.
Figure 16B:
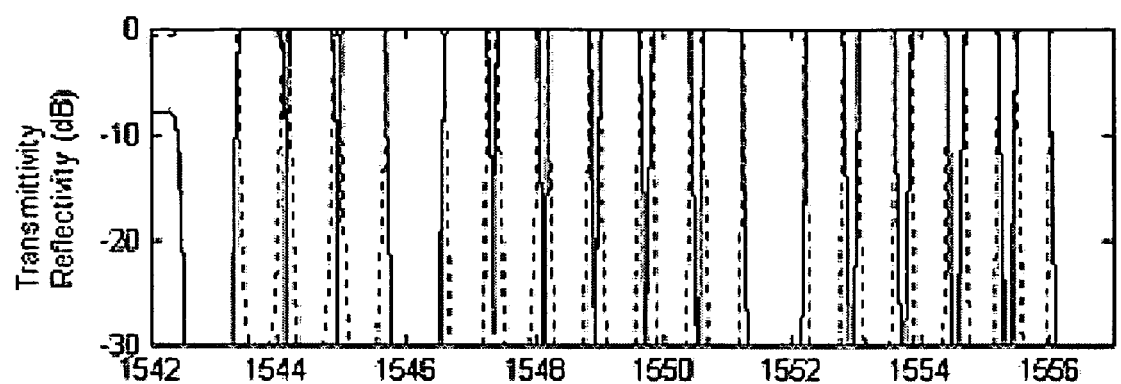
Figure 16C:
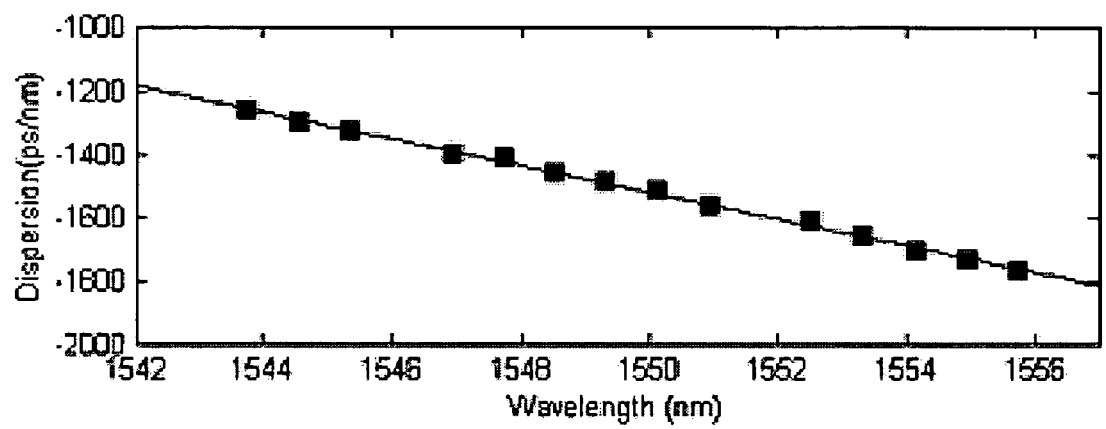

FIGS. 16A to 16C are graphs showing the phase profile, transmissivity and reflectivity spectra and dispersion of an ADM that is designed to allow the fourth, eleventh and sixteenth of sixteen input channels to be added/dropped so as to be suitable for the ADM of FIG. 7, respectively.

In the present embodiment, thirteen segments are used to obtain an optimum phase profile, L=10 cm, $\Delta n_1 = 5 \times 10^{-4}$, $\delta \Lambda_0 = 0.07$ nm/cm and $\delta \Lambda_s / \Lambda_s = 2.1\%$, and the remaining parameters are the same as the above-described embodiment.

It can be appreciated from FIG. 16B that the reflectivity for a desired channel can be accurately adjusted. Furthermore, it can be appreciated from FIG. 16C that the ADM of the present embodiment can desirably compensate for the dispersion slope of the optical fiber regardless of an increase in the number of wavelength channels.

Meanwhile, the technical concept of the present invention can be easily applied to not only an ADM but also an interleaver that alternately outputs wavelength channels.

Figure 17A:
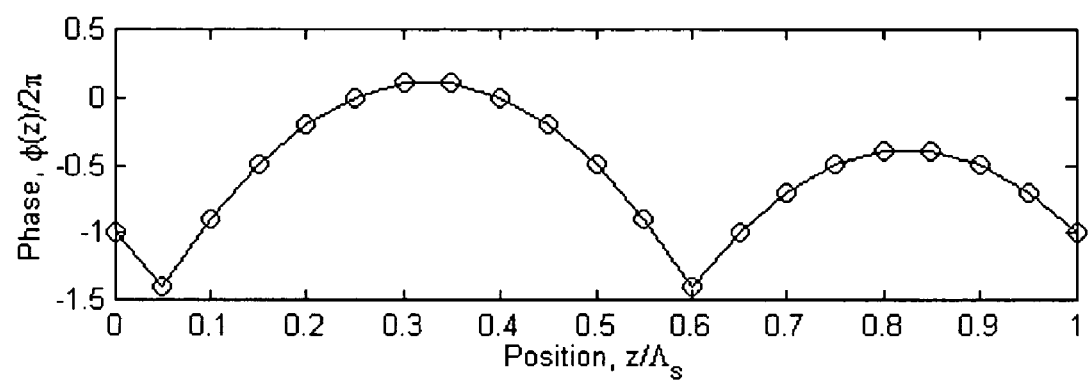
FIGS. 17A to 17C are graphs showing the phase profile, transmittivity/reflectivity and dispersion simulation results of an interleaver that alternately reflects twenty channels having a channel spacing of 50 GHz, respectively.
Figure 17B:
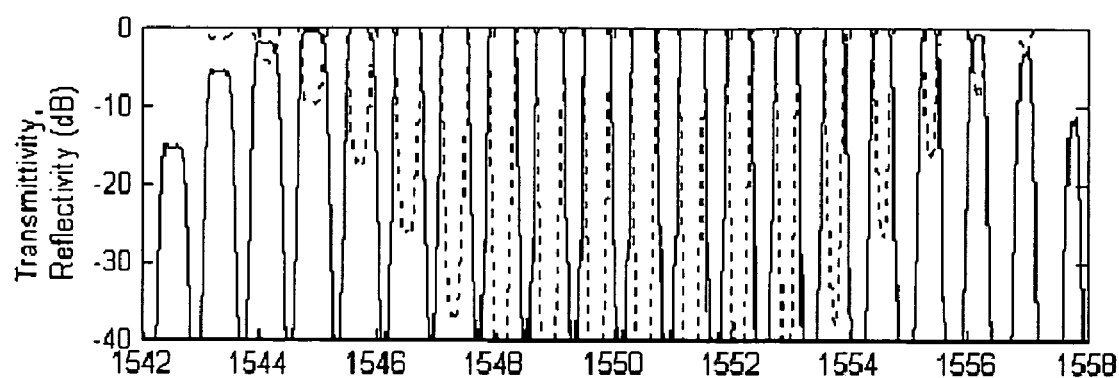
Figure 17C:
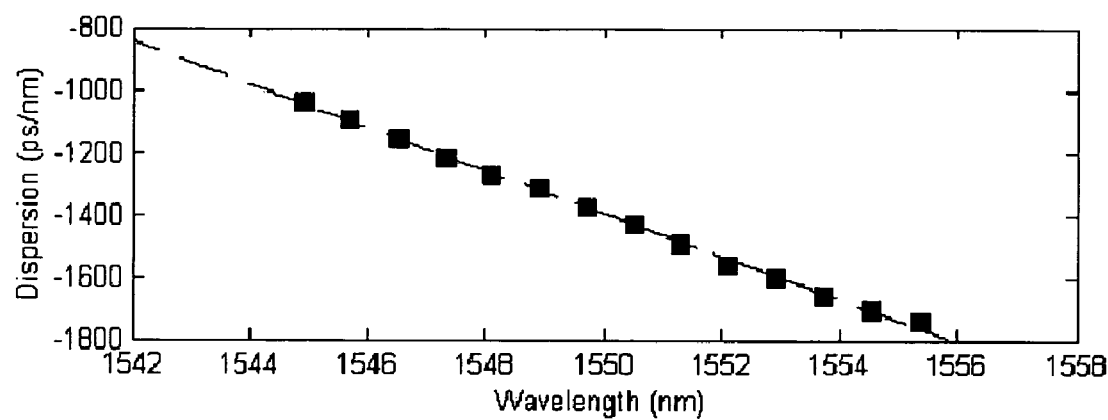

FIGS. 17A to 17C are graphs showing the phase profile, transmittivity/reflectivity and dispersion simulation results of an interleaver that alternately reflects twenty channels having a channel spacing of 50 GHz, respectively.

In the present embodiment, L=10 cm, $\Delta n_1 = 4 \times 10^{-4}$, $\Lambda_s = 2$ mm, $\delta \Lambda_0 = 0.04$ nm/cm and $\delta \Lambda_s / \Lambda_s = 2\%$ were used as grating parameters. It can be appreciated from FIG. 17B that the reflectivity for every even channel has a value close to one and every odd one of reflected channels almost vanishes. Furthermore, it can be appreciated from FIG. 17C that compensation for the dispersion of every reflected channel can be made.

In accordance with the present invention, the wavelength division multiplexing device, which has low light loss at the time of reflecting a wavelength channel and can compensate for the delay of an optical signal depending on wavelength according to the dispersion characteristics of the optical fiber, can be manufactured. Furthermore, the wavelength division multiplexing device of the present invention can be efficiently used as a broadband wavelength division device because it can compensate for the dispersion characteristics of the optical fiber notwithstanding an increase in the number of channels and much refractive modulation is required for a large number of channels in the manufacture of an FBG. Additionally, the phase-sampled FBG of the present invention is advantageous in that, as the number of channels N increases, index modulation increases in proportion to $\sqrt{N}$, so that compensation for the dispersion of many channels can be made using a little refractive index modulation.

In accordance with another aspect of the present invention, the phase-sampled FBG, which cannot only compensate for dispersion and a dispersion slope but also has a uniform channel bandwidth, can be manufactured.

Various wavelength division multiplexing devices, such as an ADM and an interleaver having dispersion compensation characteristics and a uniform bandwidth, can be implemented using the phase-sampled FBG.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wavelength division multiplexing device, comprising:
   a first optical circulator having a first plurality of ports; and
   a Fiber Bragg Grating (FBG) connected to one of the first plurality of ports of the first optical circulator to reflect or transmit some of wavelength channels of an optical signal input to the first optical circulator;
   wherein the FBG has a phase-sampled grating with a coupling coefficient, and in which a refractive index of an optical fiber core is modulated by a predetermined chirp in a grating period and a predetermined chirp in a sampling period, and the chirps in the grating period and the sampling period are set to allow dispersion values of all wavelength channels, which are reflected in the FBG, to have a linear function relationship with wavelengths;
   wherein the coupling coefficient is expressed by the following equation:

$\kappa_m = \pi \Delta n_1 F_m / \lambda_B$ where $\Delta n_1$ is a modulation amplitude constant, $\lambda_B$ is a Bragg wavelength, and $F_m$ is a Fourier coefficient that is used to express a phase sampling function $\phi(z)$ in terms of a refractive index of the FBG using the following equation, $n(z) = n_0 + \Delta n_1 \text{Re}\{\exp[i(2\beta_0 z + \phi(z))]\}$
   $= n_0 + \Delta n_1 \text{Re}\left\{\sum_m F_m \exp[2i(\beta_0 + m\beta_s)z]\right\}$ wherein $n_0$ is an average refractive index, $\beta_0 = \pi/\Lambda_0$, $\beta_s = \pi/\Lambda_s$, $\Lambda_0$ is an average grating period and $\Lambda_s$ is a period of a sampling function.

2. The wavelength division multiplexing device as set forth in claim 1, wherein the chirp in the sampling period is designed so that the sampling period varies at a predetermined rate in a direction of a length of the FBG.

3. The wavelength division multiplexing device as set forth in claim 1, wherein the chirp in the sampling period is designed so that a relative difference between an initial sampling period and a final sampling period falls within a range of approximately 0.1 to 7%.

4. The wavelength division multiplexing device as set forth in claim 1, further comprising a second optical circulator having a second plurality of ports, the second optical circulator being optically connected to the FBG to extract one or more channels passing through the FBG and to add one or more wavelength channels, which are input through any of the second plurality of ports, to the wavelength channels reflected in the FBG.

5. The wavelength division multiplexing device as set forth in claim 1, wherein the FBG alternately reflects wavelength channels of the optical signal input to the first optical circulator.

6. A wavelength division multiplexing device, comprising:
   a first optical circulator having a first plurality of ports; and
   an FBG connected to one of the first plurality of ports of the first optical circulator to reflect or transmit some of wavelength channels of an optical signal input to the first optical circulator;
   wherein the FBG is a phase-sampled grating, in which a refractive index of an optical fiber core is modulated by a predetermined chirp in a grating period and a predetermined chirp in a coupling coefficient, and the chirps in the grating period and the coupling coefficient are set to allow dispersion values of all wavelength channels, which are reflected in the FBG, to have a linear function relationship with wavelengths, wherein the coupling coeffient is expressed by the following equation:

$\kappa_m = \pi \Delta n_1 F_m / \lambda_B$ where $\Delta n_1$ is a modulation amplitude constant, $\lambda_B$ is a Bragg wavelength, and $F_m$ is a Fourier coefficient that is used to express a phase sampling function $\phi(z)$ in terms of a refractive index of the FBG using the following equation, $n(z) = n_0 + \Delta n_1 \text{Re}\{\exp[i(2\beta_0 z + \phi(z))]\}$
   $= n_0 + \Delta n_1 \text{Re}\left\{\sum_m F_m \exp[2i(\beta_0 + m\beta_s)z]\right\}$ wherein $n_s$ is an average refractive index, $\beta_0 = \pi/\Lambda_0$, $\beta_s = \pi/\Lambda_s$, $\Lambda_0$ is an average grating period and $\Lambda_s$ is a period of a sampling function.

7. The wavelength division multiplexing device as set forth in claim 6, wherein the chirp in the coupling coefficient is designed so that the coupling coefficient varies at a predetermined rate as WDM channel wavelength increases.

8. The wavelength division multiplexing device as set forth in claim 6, further comprising a second optical circulator having a second plurality of ports, the second optical circulator being optically connected to the FBG to extract one or more channels passing through the FBG and to add one or more wavelength channels, which are input through any of the second plurality of ports, to the wavelength channels that are reflected in the FBG.

9. The wavelength division multiplexing device as set forth in claim 6, wherein the FBG alternately reflects wavelength channels of the optical signal input to the first optical circulator.

10. A wavelength division multiplexing device, comprising:
- a first optical circulator having a first plurality of ports; and
- an FBG connected to one of the first plurality of ports of the first optical circulator to reflect or transmit some of wavelength channels of an optical signal input to the first optical circulator;
- wherein the FBG is a phase-sampled grating, in which a refractive index of an optical fiber core is modulated by a predetermined chirp in a grating period, a predetermined chirp in a sampling period and a predetermined chirp in a coupling coefficient, and the chirps in the grating period, the sampling period and the coupling coefficient are set to allow channel bandwidths of all wavelength channels, which are reflected in the FBG, to be substantially identical to each other, wherein the coupling coefficient is expressed by the following equation:

$$\kappa_m = \pi \Delta n_1 F_m / \lambda_B$$

where $\Delta n_1$ is a modulation amplitude constant, $\lambda_B$ is a Bragg wavelength, and $F_m$ is a Fourier coefficient that is used to express a phase sampling function $\phi(z)$ in terms of a refractive index of the FBG using the following equation, $$n(z) = n_0 + \Delta n_1 \mathrm{Re}\{\exp[i(2\beta_0 z + \phi(z))]\}$$

$$= n_0 + \Delta n_1 \mathrm{Re}\left\{\sum_m F_m \exp[2i(\beta_0 + m\beta_s)z]\right\}$$

wherein $n_0$ is an average refractive index, $\beta_0 = \pi/\Lambda_0$, $\beta_s = \pi/\Lambda_s$, $\Lambda_0$ is an average grating period and $\Lambda_s$ is a period of a sampling function.

11. The wavelength division multiplexing device as set forth in claim 10, further comprising a second optical circulator having a second plurality of ports, the second optical circulator being optically connected to the FBG to extract one or more channels passing through the FBG and to add one or more wavelength channels, which are input through any of the second plurality of ports, to the wavelength channels that are reflected in the FBG.

12. The wavelength division multiplexing device as set forth in claim 10, wherein the FBG alternately reflects wavelength channels of the optical signal input to the first optical circulator.

* * * * *